(12) United States Patent
Kato et al.

(10) Patent No.: US 6,184,648 B1
(45) Date of Patent: Feb. 6, 2001

(54) MOTOR CONTROL APPARATUS

(75) Inventors: Yoshihito Kato, Fuchu; Tadamitsu Yoshikawa, Ome, both of (JP)

(73) Assignee: Kabushiki Kaisha Toshiba, Kanagawa (JP)

( * ) Notice: Under 35 U.S.C. 154(b), the term of this patent shall be extended for 0 days.

(21) Appl. No.: 09/409,086

(22) Filed: Sep. 30, 1999

(30) Foreign Application Priority Data

Oct. 1, 1998 (JP) .................................................. 10-280112

(51) Int. Cl.[7] ...................................................... H02P 5/408
(52) U.S. Cl. .......................... 318/811; 318/800; 318/801
(58) Field of Search .................................. 318/767, 778, 318/779, 798–802, 807, 811

(56) References Cited

U.S. PATENT DOCUMENTS

| 5,032,771 | * | 7/1991 | Kerkman et al. | 318/52 |
| 5,448,150 | * | 9/1995 | Yamamoto et al. | 318/805 |
| 5,585,708 | * | 12/1996 | Richardson et al. | 318/800 |
| 6,107,774 | * | 8/2000 | Yamada et al. | 318/807 |

FOREIGN PATENT DOCUMENTS

| 60-13398 | 4/1985 | (JP) . |
| 11-98891 | 4/1999 | (JP) . |
| 11-98897 | 4/1999 | (JP) . |

* cited by examiner

Primary Examiner—Bentsu Ro
(74) Attorney, Agent, or Firm—Foley & Lardner (57) ABSTRACT

According to this invention, there is provided a motor control apparatus comprising a field weakening device for converting a velocity feedback signal obtained from the rotational speed of a motor into a secondary magnetic flux reference signal by using a field pattern, a field pattern selector for comparing a predetermined signal with a q-axis torque current reference signal obtained on the basis of the secondary magnetic flux reference signal converted by the field weakening device, the velocity feedback signal, a velocity reference signal, and a torque reference signal, and outputting, on the basis of the comparison result, a control signal for switching the field pattern, and a field pattern storage section for switching, on the basis of the control signal output from said field pattern selector, the field pattern to be used in the field weakening device. Since the selector can switch the field pattern, an accurate torque output can be realized.

11 Claims, 7 Drawing Sheets

FIG. 8

MOTOR CONTROL APPARATUS

BACKGROUND OF THE INVENTION

The present invention relates to a control apparatus for driving a motor and, more particularly, to a control apparatus for a motor which requires an accurate torque output.

This patent application is based on Japanese Patent Application No. 10-280112, filed Oct. 1, 1998, the entire content of which is incorporated herein by reference.

Figure 1:
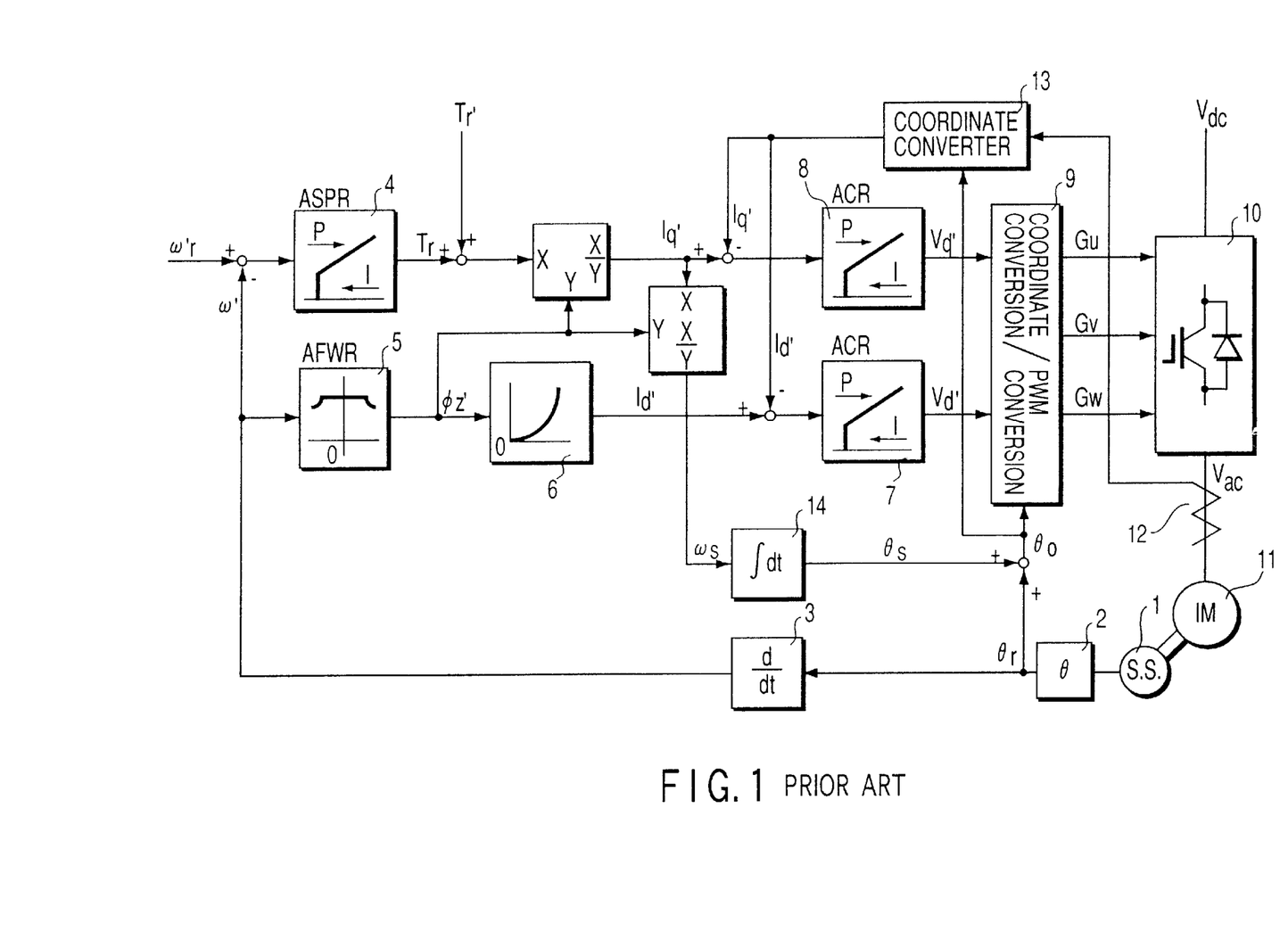
FIG. 1 is a block diagram showing a conventional motor control apparatus.

FIG. 1 shows the general arrangement of an IGBT inverter apparatus.

FIG. 1 shows a power driving apparatus based on vector control with velocity feedback and current feedback control.

As shown in FIG. 1, an input velocity reference signal ωr* and a velocity feedback signal ω' calculated by a velocity detector 1, primary magnetic flux angle calculator 2, and differentiator 3 are feedback-calculated. The calculation result is converted into a torque reference signal Tr by a velocity controller 4. A new torque reference signal is calculated by adding the torque reference signal Tr to a torque reference signal Tr* input from a main host apparatus. The calculated torque reference signal is divided by a secondary magnetic flux reference $\Phi_2$* to obtain a q-axis torque reference signal Iq*.

On the other hand, a field weakening controller 5 and magnetic flux saturation pattern generator 6 are used to calculate a d-axis current reference signal Id* from the velocity feedback signal ω'. The calculated q-axis torque reference signal Iq* and d-axis current reference signal Id* and d- and q-axis current feedback signals Id' and Iq' are feedback-calculated to generate final current reference signals Id* and Iq*, respectively.

The current reference signals Id* and Iq* are output from current controllers 7 and 8 as voltage references Vd* and Vq*, respectively.

A coordinate conversion/PWM conversion device 9 outputs element gate ignition pulse instructions Gu, Gv, and Gw on the basis of the voltage references Vd* and Vq* output from the current controllers 7 and 8.

On the basis of the element gate trigger pulse instructions Gu, Gv, and Gw output from the coordinate conversion/PWM conversion device 9, a power converter 10 converts a DC voltage Vdc supplied from a DC current source into a desired AC voltage Vac and outputs the voltage. The power converter 10 supplies a desired current to a motor 11 to drive it.

In the above arrangement, for a d-axis field current Id as a motor field component in vector control, the secondary magnetic flux reference $\Phi_2$* is calculated in accordance with the velocity feedback signal ω' using a certain field pattern in the field weakening controller 5.

The field pattern in the field weakening controller 5 is determined by the motor connected to the motor control apparatus and set as a fixed value. When a velocity feedback signal ω having a certain magnitude is input, the field current component Id in the d-axis of the motor is calculated in accordance with the field pattern.

On the basis of a primary magnetic flux angle θr calculated by the primary magnetic flux angle calculator 2 and a slip angle θs calculated by vector control, a secondary magnetic flux angle θo necessary for vector control such as 2-to 3-axis conversion or 3- to 2-axis conversion is obtained. For this reason, calculation of the secondary magnetic flux angle θo produces a delay.

Figure 2:
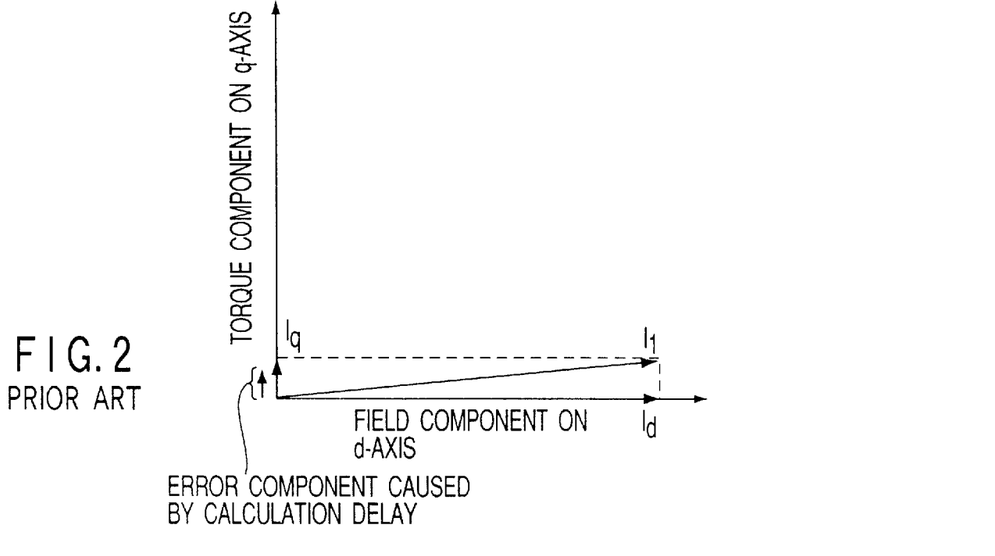
FIG. 2 is a graph showing the motor current on a d-q plane in the conventional motor control apparatus shown in FIG. 1 in the low-load mode.

In the above-described conventional motor control apparatus, in a region where the motor load as the load of the motor control apparatus is low, a motor current vector $I_1$ in vector control stays close to the d-axis as an excitation current component, as shown in FIG. 2, and we have $$I_1 = I_d \quad (1)$$

When the motor current $I_1$ stays near the d-axis as the field current component, the ratio of an error component caused by the conversion/calculation delay in the current feedback coordinate converter 13 and coordinate conversion/PWM conversion device 9 in the current feedback loop to the q-axis torque current component signal Iq as the torque component in vector control is high in the low-load mode, resulting in degradation in torque accuracy.

BRIEF SUMMARY OF THE INVENTION

The present invention has been made to solve the above problem, and has as its object to provide a motor control apparatus which suppresses degradation in torque accuracy and realizes an accurate and stable torque output.

In order to achieve the above object, according to the first aspect of the present invention, there is provided a motor control apparatus comprising:

a field weakening device for converting a velocity feedback signal obtained from a rotational speed of a motor into a secondary magnetic flux reference signal by using a field pattern;

a field pattern selector for comparing a predetermined signal with a q-axis torque current reference signal obtained on the basis of the secondary magnetic flux reference signal converted by the field weakening device, the velocity feedback signal, a velocity reference signal, and a torque reference signal, and outputting, on the basis of a comparison result, a control signal for switching the field pattern; and a field pattern storage section for switching, on the basis of the control signal output from the field pattern selector, the field pattern to be used in the field weakening device.

According to this invention, the magnitude of the d-axis field current vector in vector control is changed by switching the field pattern, thereby setting an arbitrary optimum vector as the motor current vector. Hence, coarseness in the torque accuracy due to conversion/calculation delay in the current feedback coordinate converter and coordinate conversion/PWM conversion device in the current feedback loop can be suppressed, and an accurate torque output can be realized.

According to the second aspect of the present invention, there is provided a motor control apparatus according to the first aspect, wherein the field pattern storage section forcibly switches the field pattern to be used in the field weakening device to a flat field pattern.

According to this invention, when the load of the AC motor reaches a desired low region, a flat field pattern is supplied. With this operation, an error in the d-axis current component due to approximation of the saturation pattern is eliminated in the low-load region, and a more accurate and stable torque can be output.

According to the third aspect of the present invention, there is provided a motor control apparatus according to the first aspect, wherein the field pattern storage section further comprises a section for forcibly switching the field pattern in the field weakening device on the basis of a control signal for switching the field pattern, which is input from a main apparatus.

According to this invention, the field pattern is switched by the control signal output from the main apparatus on the basis of the load of the AC motor or running method. For this reason, running torque output can be realized on the basis of the load situation of the AC motor.

According to the fourth aspect of the present invention, there is provided a motor control apparatus according to the first aspect, further comprising a suppressing section for suppressing a rate of change of the secondary magnetic flux reference signal converted by the field weakening device within a predetermined range of the rate of change.

According to this invention, since the rate of change of the secondary magnetic flux reference signal in switching the field pattern is limited within a predetermined range, the field can be smoothly switched.

According to the fifth aspect of the present invention, there is provided a motor control apparatus comprising:

a field weakening device for converting a velocity feedback signal obtained from a rotational speed of a motor into a secondary magnetic flux reference signal by using a field pattern;

a field shift calculator for calculating a shift amount of the field pattern to be used in the field weakening device, on the basis of a q-axis torque current reference signal obtained on the basis of the secondary magnetic flux reference signal converted by the field weakening device, the velocity feedback signal, a velocity reference signal, and a torque reference signal, such that a vector angle of a motor current vector falls within a predetermined range; and a field pattern storage section for shifting, on the basis of the shift amount calculated by the field shift calculator, the field pattern to be used in the field weakening device.

According to this invention, since the field pattern is dynamically shifted in accordance with the load of the AC motor, an accurate and smooth torque can be output.

According to the sixth aspect of the present invention, there is provided a motor control apparatus comprising:

a field weakening device for converting a velocity feedback signal obtained from a rotational speed of a motor into a secondary magnetic flux reference signal by using a field pattern; and a current calculator for calculating a d-axis field reference signal, on the basis of a q-axis torque current reference signal obtained on the basis of the secondary magnetic flux reference signal converted by the field weakening device, the velocity feedback signal, a velocity reference signal, and a torque reference signal, such that a vector angle of a motor current vector falls within a predetermined range.

According to this invention, since the d-axis field reference signal is calculated such that the vector angle of the motor current vector falls within a predetermined range, an accurate torque output can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 3:
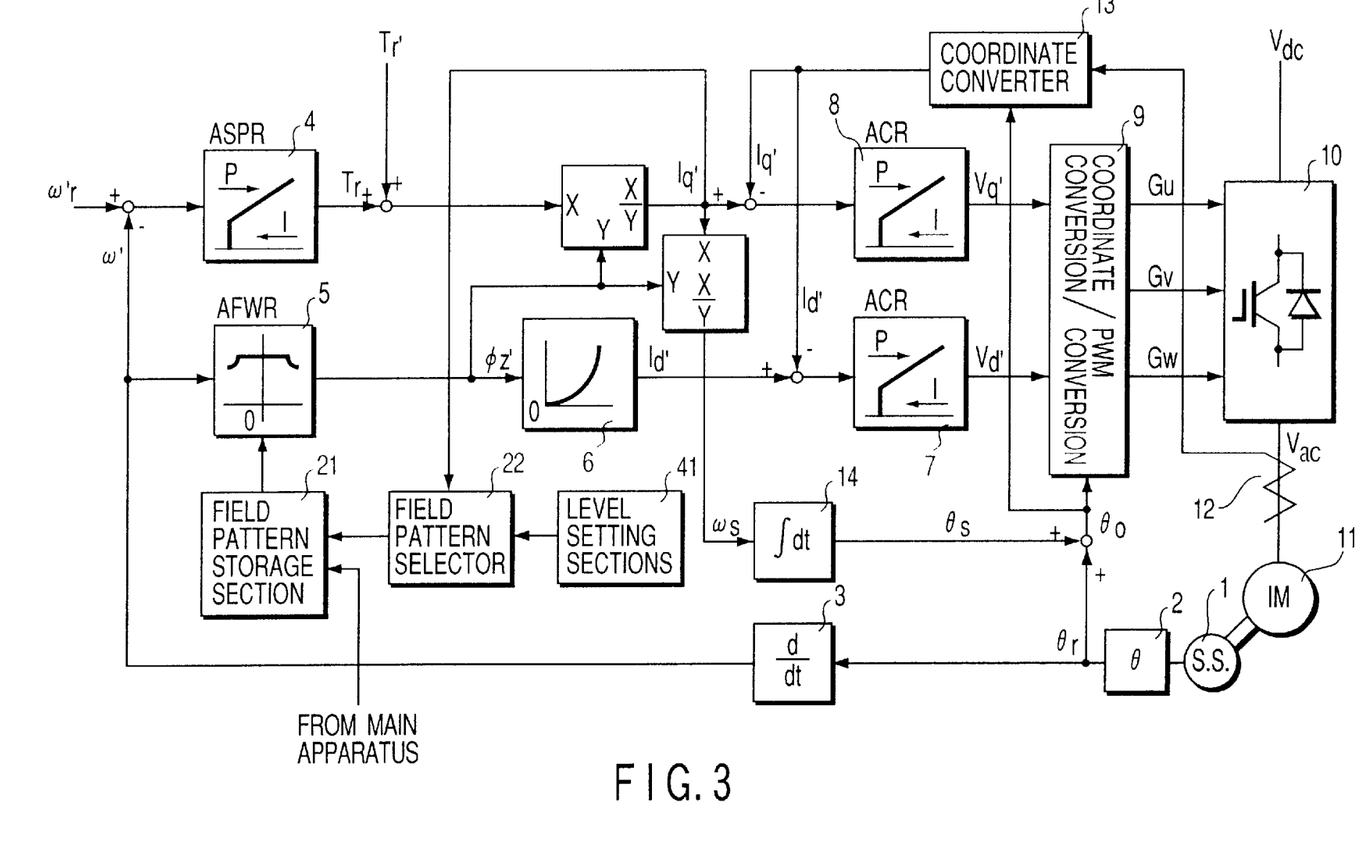
FIG. 3 is a block diagram showing a motor control apparatus according to the first embodiment of the present invention.

FIG. 3 is a block diagram showing a motor control apparatus according to the first embodiment of the present invention. The same reference numerals as in FIG. 1 denote the same parts in FIG. 3.

As the characteristic feature of the first embodiment, a level setting section 41, field pattern selector 22, and field pattern storage section 21 are added.

In the motor control apparatus shown in FIG. 3, a velocity reference signal ωr* input from a main host apparatus and a velocity feedback signal ω' calculated by a primary magnetic flux angle calculator 2 and differentiator 3 are feedback-calculated to obtain a velocity reference signal.

The calculated velocity reference signal is converted into a torque reference signal Tr by a velocity controller 4. The converted torque reference signal Tr is added to a torque reference signal Tr* input from the main apparatus to obtain a new torque reference signal.

When the calculated torque reference signal is divided by a secondary magnetic flux reference $\Phi_2^*$, a q-axis torque current reference signal Iq* is obtained.

The calculated q-axis torque current reference signal Iq* and a q-axis current feedback signal Iq' are feedback-calculated. The feedback calculation result is input to a current controller 8. The current controller 8 converts the feedback calculation result into a q-axis voltage reference signal Vq*.

A field weakening controller 5 converts the velocity feedback signal ω' into the secondary magnetic flux reference $\Phi_2^*$. The secondary magnetic flux reference $\Phi_2^*$ converted by the field weakening controller 5 is converted into a d-axis field current reference signal Id* by a magnetic flux saturation pattern generator 6.

A current controller 7 converts the feedback calculation result of the d-axis field current reference signal Id* from the magnetic flux saturation pattern generator 6 and a d-axis current feedback signal Id' into a d-axis voltage reference signal Vd*.

A coordinate conversion/PWM conversion device 9 2-to 3-axis/ d-to q-axis converts the d- and q-axis voltage reference signals Vd* and Vq* to generate PWM (Pulse Width Modulation) signals Gu, Gv, and Gw. A power converter 10 converts the PWM signals Gu, Gv, and Gw from the coordinate conversion/PWM conversion device 9 into a motor driving AC voltage. With the converted motor driving AC voltage, a desired current is supplied to a motor 11 to drive it.

A velocity detector 1 detects the rotational speed of the motor 11. A current detector 12 detects the current flowing to the motor 11. A current feedback coordinate converter 13 3-to 2-axis- and d-to q-axis-converts the current feedback signal detected by the current detector 12 and outputs the d-axis feedback current component Id' and q-axis feedback current component Iq' in vector control.

A slip integrator 14 integrates a slip $\omega s$ calculated from the secondary magnetic flux reference $\Phi_2^*$ from the field weakening controller 5 and the q-axis torque current reference signal Iq* to calculate a slip angle $\theta s$.

The level setting section 41 sets, in the field pattern selector 22, a torque current value as the field switching level used in the field pattern selector 22.

The field pattern selector 22 compares the q-axis current reference signal Iq* with the torque current value as the field switching level. When the q-axis current reference signal Iq* is smaller than the torque current value as the field switching level, the field pattern selector 22 outputs a field pattern switching instruction.

Figure 10:
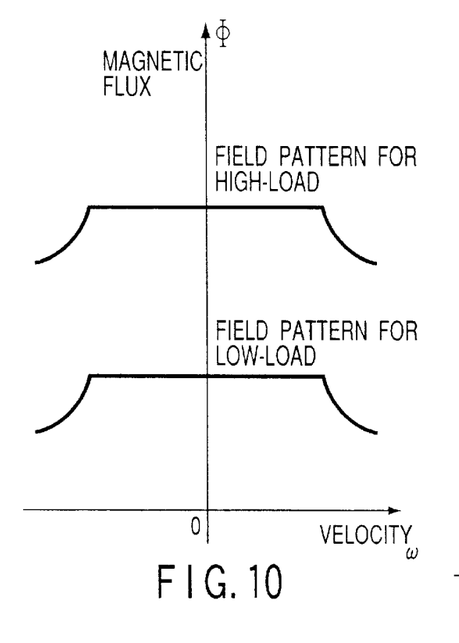
FIG. 10 is a graph showing a field pattern for low-load.

As shown in FIG. 10, the field pattern storage section 21 has a normal field pattern and a field pattern for low-load. On the basis of the field pattern switching instruction from the field pattern selector 22, the field pattern storage section 21 switches the normal field pattern to the field pattern for low-load and outputs the field pattern for low-load to the field weakening controller 5.

That is, the field pattern selector 22 compares the torque current value set by the level setting section 41 as the field switching level with the q-axis torque current reference signal Iq* as the torque current component of the motor control apparatus. When the q-axis current reference signal Iq* is smaller than the value of the field switching level, the field pattern selector 22 outputs a field pattern switching instruction to the field pattern storage section 21.

Upon receiving the field pattern switching instruction from the field pattern selector 22, the field pattern storage section 21 outputs the field pattern for low-load to the field weakening controller 5. The field weakening controller 5 calculates on the basis of the field pattern for low-load output from the field pattern storage section 21.

Figure 4:
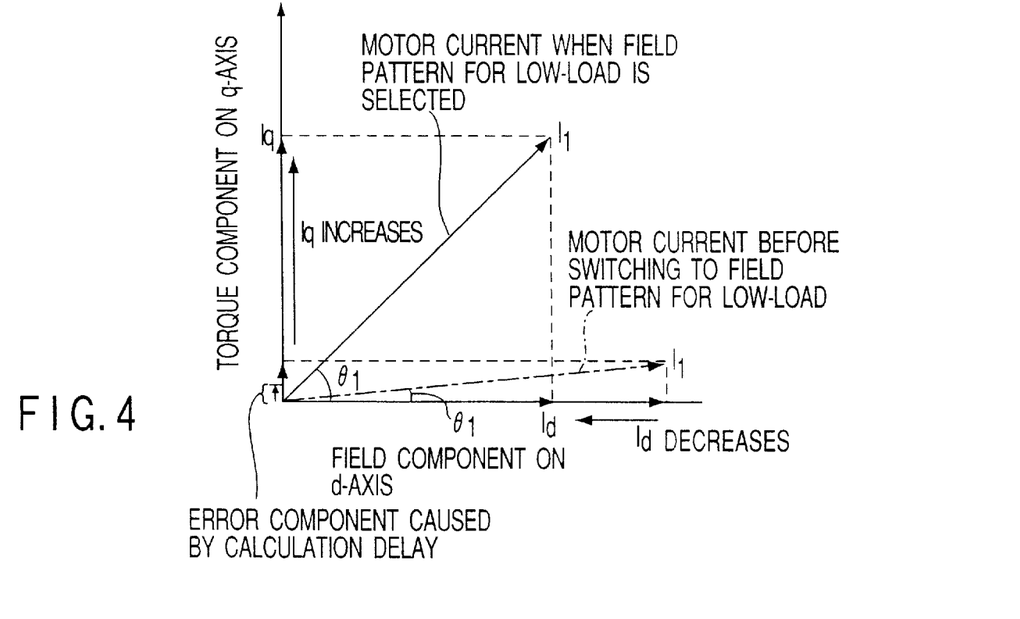
FIG. 4 is a graph showing the relationship between the d- and q-axis current vectors and the motor current vector as the synthesized vector thereof in vector control when a field pattern is switched in the first embodiment shown in FIG. 3.

A d-axis field current reference signal Id* smaller than a normal d-axis field current reference signal Id is calculated. When the d-axis field current reference signal Id* is suppressed, the q-axis torque current reference signal Iq* increases in inverse proportion to the signal Id*. For this reason, the magnitude of a motor current vector $I_1$ remains unchanged. The relative ratio between the d-axis field current reference signal Id* and the q-axis torque current reference signal Iq* is almost 1:1, as shown in FIG. 4. A motor current vector angle $\theta_1$ is controlled to have a magnitude near a vector angle of 45°, which is near the center between the d-axis and q-axis.

When the motor load is low, degradation in the torque accuracy can be suppressed even when the ratio of the torque current component becomes high with respect to the error component caused by a calculation delay in the control system such as coordinate conversion or coordinate conversion/PWM conversion in the current feedback loop due to a secondary magnetic flux angle $\theta o$.

For example, assume that the q-axis torque current reference signal Iq* is about 7% the rated value, and the field pattern switching level set in advance is 10%. In this case, the field pattern selector 22 determines that the field pattern need be switched and outputs an instruction for selecting the field pattern for low-load.

Upon receiving this selection instruction, the field pattern storage section 21 outputs the field pattern for low-load to the d-axis field current reference signal calculation control system for vector control. On the basis of the field pattern, a d-axis field current reference signal Id* with a value smaller than the normal value is calculated. When the d-axis field current reference signal Id* is suppressed, the q-axis current reference signal Iq* increases in inverse proportion to the d-axis field current reference signal Id*. On the d-q-axis plane, the angle $\theta_1$ of the motor current vector $I_1$ increases. The motor current vector $I_1$ is controlled to stay near the center between the d-axis and q-axis.

When the q-axis torque current Iq* is increased, the influence of the error component caused by a conversion/calculation delay in the current feedback coordinate converter 7 and coordinate conversion/PWM conversion device 8 due to the secondary magnetic flux angle $\theta o$ generated when the motor current vector $I_1$ stays near the d-axis as the field current component, i.e., the vector angle $\theta_1$ of the motor current vector $I_1$ is small can be suppressed, and degradation in the torque accuracy in the low-load mode can be prevented.

Figure 11:
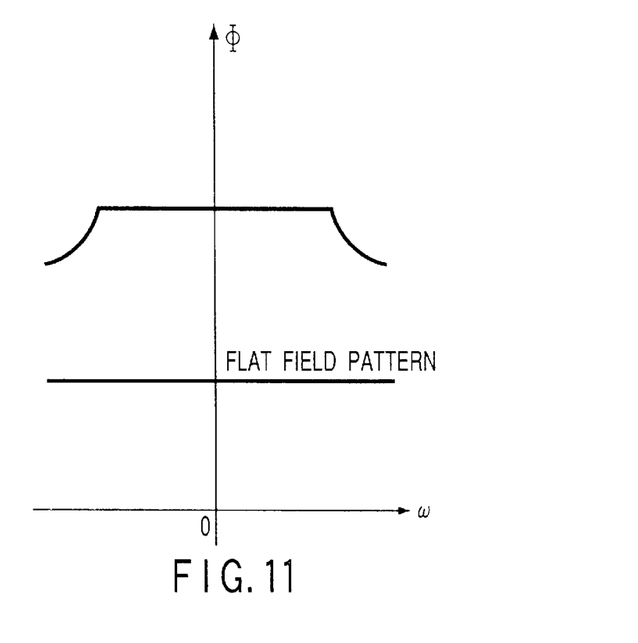
FIG. 11 is a graph showing a flat field pattern.

The field pattern storage section 21 has a means for forcibly making the field weakening pattern in the field weakening region flat. When the motor load reaches a predetermined low region, a flat field pattern from which a weakening magnetic flux curve in the field weakening region in the field pattern is removed, as shown in FIG. 11, is supplied to eliminate any error in the d-axis current component due to approximation of the saturation pattern in the low-load region. Hence, a more accurate and stable torque can be output.

The field pattern switching instruction may be directly input from the main host apparatus to the field pattern storage section 21. In this case, when an accurate torque output is necessary for an arbitrary plant operation method, the field pattern of the control apparatus is switched in a multi-stage in accordance with the operation method and application purpose.

Second Embodiment

A motor control apparatus according to the second embodiment of the present invention will be described next.

Figure 5:
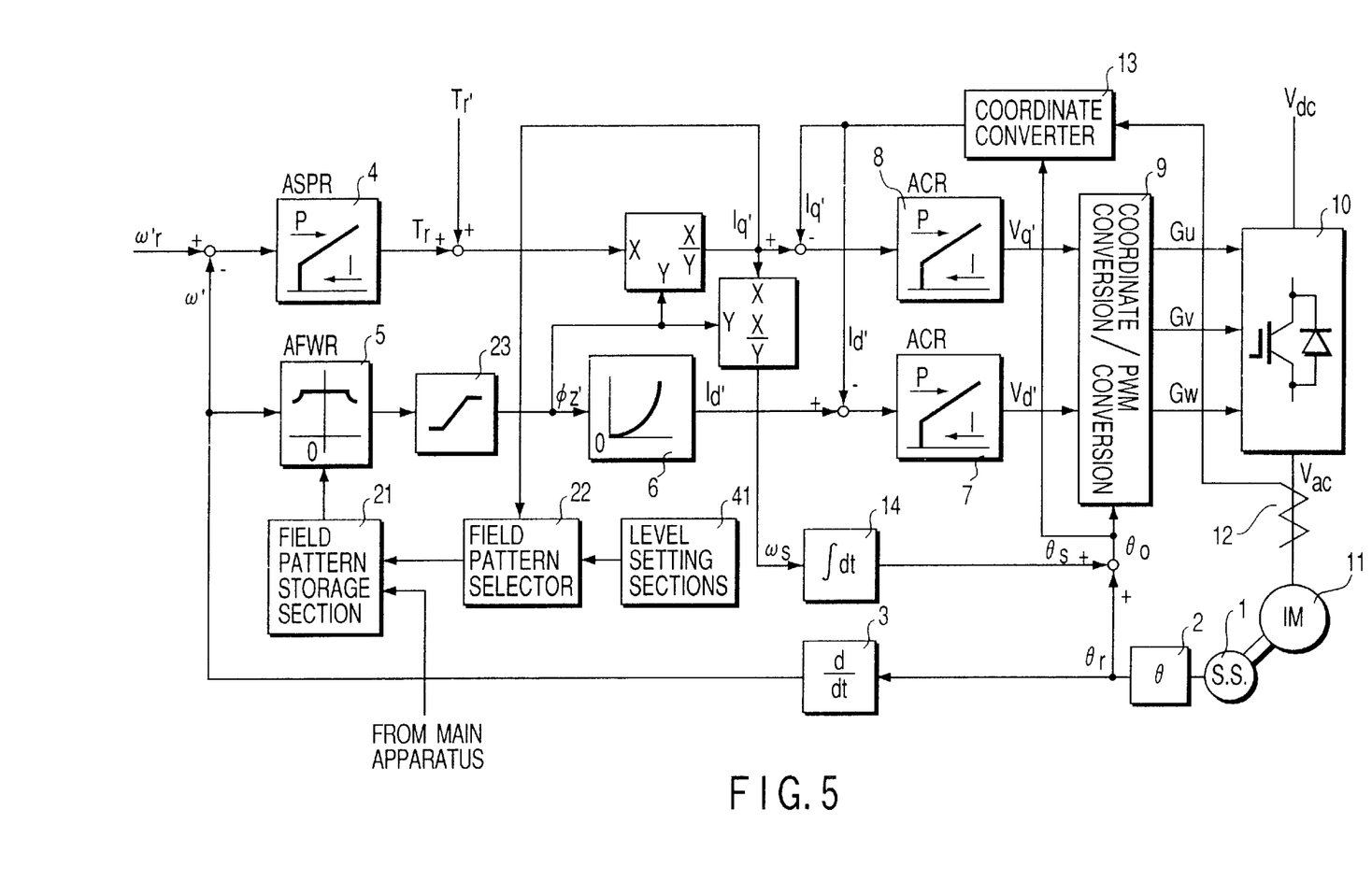
FIG. 5 is a block diagram showing a motor control apparatus according to the second embodiment of the present invention.

FIG. 5 is a block diagram showing the motor control apparatus according to the second embodiment of the present invention. AS shown in FIG. 5, as the characteristic feature of the motor control apparatus of the second embodiment, a field switching rate device 23 is added to the motor control apparatus of the first embodiment.

The field switching rate device 23 suppresses an abrupt change in a d-axis field current vector Id when the field pattern to be output from a field pattern storage section 21 is switched. More specifically, the field switching rate device 23 suppresses the rate of change of a secondary magnetic flux reference $\Phi_2^*$ to a predetermined value to suppress any abrupt change in the secondary magnetic flux reference $\Phi_2^*$ output from a field weakening controller 5.

According to the second embodiment, the field pattern can be smoothly switched, and an abrupt change in the d-axis field current vector Id can be suppressed.

Third Embodiment

A motor control apparatus according to the third embodiment of the present invention will be described next.

Figure 6:
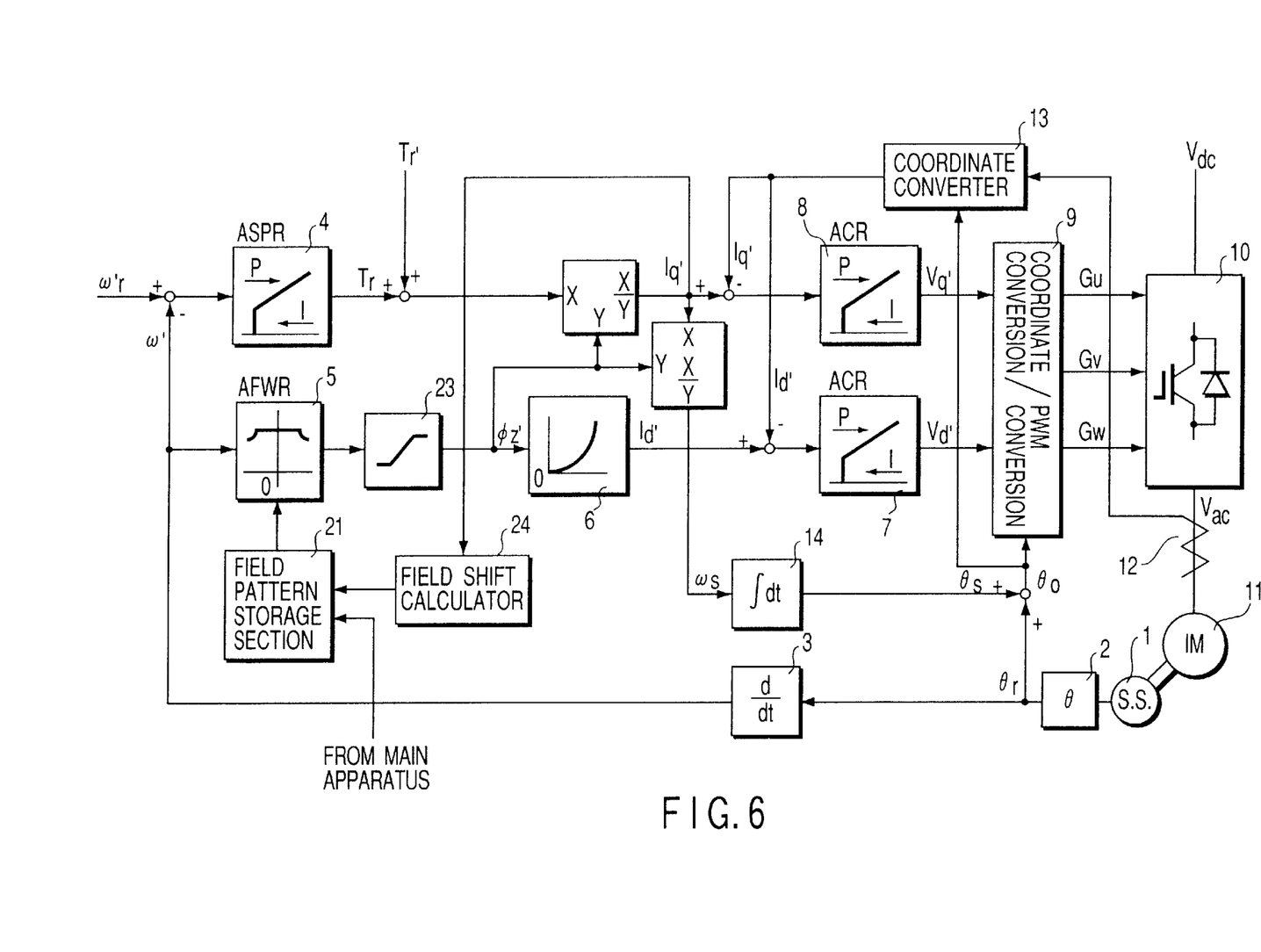
FIG. 6 is a block diagram showing a motor control apparatus according to the third embodiment of the present invention.

FIG. 6 is a block diagram showing the motor control apparatus according to the third embodiment of the present invention.

As shown in FIG. 6, as the characteristic feature of the third embodiment, a field shift calculator 24 is used in place of the level setting section 41 and field pattern selector 22 shown in FIG. 3.

To dynamically shift the field pattern in accordance with the motor load, the field shift calculator 24 calculates the shift width of the field pattern from the magnitude of a q-axis current feedback signal Iq' such that a vector angle $\theta_1$ of a motor current vector $I_1$ falls within a predetermined range. This calculated shift width is output to a field pattern storage section 21.

Figure 7:
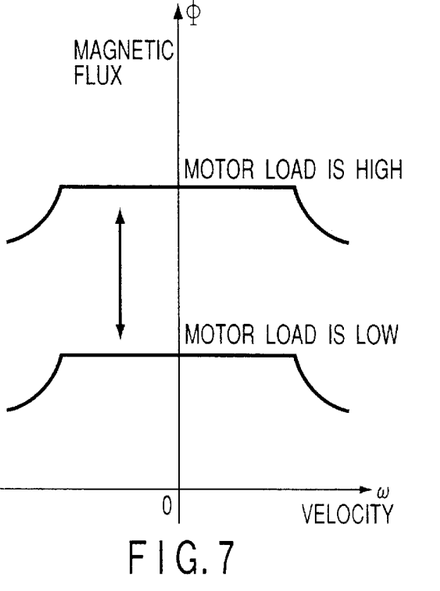
FIG. 7 is a graph showing the relationship between the magnitude of a motor load and the shift in a field pattern in the third embodiment of the present invention.

On the basis of the shift width output from the field shift calculator 24, the field pattern storage section 21 vertically shifts the entire field pattern, as shown in FIG. 7. With this method, the q-axis torque current in the d-q plane of vector control is increased to improve the torque accuracy and, more particularly, the accuracy in the low-torque region.

Fourth Embodiment

Figure 8:
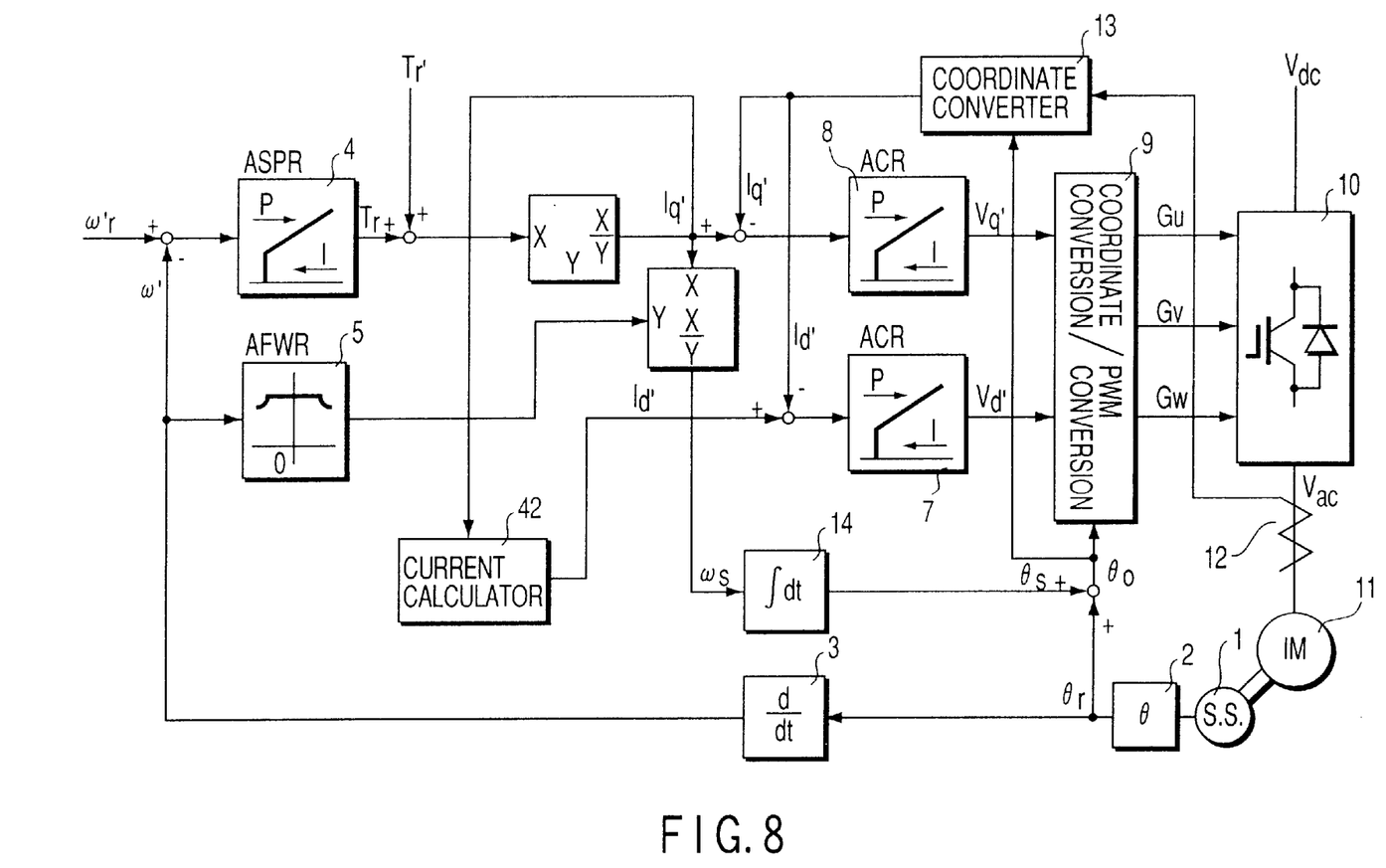
FIG. 8 is a block diagram showing a motor control apparatus according to the fourth embodiment of the present invention.

A motor control apparatus according to the fourth embodiment of the present invention will be described next. FIG. 8 is a block diagram showing the motor control apparatus according to the fourth embodiment of the present invention.

As shown in FIG. 8, the motor control apparatus of the fourth embodiment is obtained by removing a field weakening controller 5, field pattern selector 22, and level setting section 41 from the motor control apparatus shown in FIG. 3 and adding a current calculator 42 to it.

Figure 9:
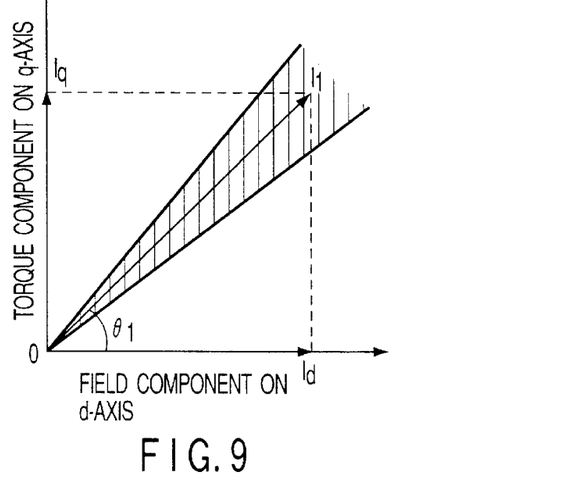
FIG. 9 is a graph showing the control range of the motor current vector on a d-q plane in the fourth embodiment shown in FIG. 8.

As shown in FIG. 9, the current calculator 42 controls a d-axis field current reference signal Id* on the basis of a q-axis torque current reference signal Iq* such that a vector angle $\theta_1$ of a motor current vector $I_1$ in vector control falls within a desired range centered on a vector angle of 45°, which is the center between the d-axis and q-axis on the d-q vector plane. This makes positive vector control possible in terms of torque accuracy.

For example, when the ratio between the d-axis current reference signal and the q-axis current reference signal, i.e., the motor current vector $I_1$ is offset to the d-axis side, the current calculator 42 weakens the d-axis field current to increase the q-axis torque current, thereby implementing vector control such that the motor current vector $I_1$ as the synthesized vector of the two current components is always at a vector angle of 45°, the central position between the d-axis and q-axis. This makes it possible to output an accurate torque.

As has been described above, according to the present invention, degradation in the torque accuracy can be suppressed, and an accurate and stable torque output can be realized.

According to the present invention, the magnitude of the d-axis field current vector in vector control is optimized by switching the field pattern, thereby setting an arbitrary optimum vector as the motor current vector. With this arrangement, a system which suppresses degradation in the torque accuracy due to the error component caused by a conversion/calculation delay in the current feedback coordinate converter and coordinate conversion/PWM conversion device in the current feedback loop resulting from the secondary magnetic flux angle and realizes an accurate and stable torque output can be constructed.

According to the present invention, when the motor load reaches a desired low region, a flat field pattern from which a weakening magnetic flux curve in the field weakening region in the field pattern is removed is supplied. With this operation, any error in the d-axis current component due to approximation of the saturation pattern in the low-load region can be eliminated, and a more accurate and stable torque can be output.

According to the present invention, when the rate of change in switching the field pattern is limited by an arbitrary rate in accordance with the magnitude of the motor load, an abrupt change in the field current vector Id can be suppressed. Hence, an accurate and smooth torque can be output, and the load on the mechanical system connected to the motor can be decreased.

According to the present invention, when the torque accuracy need be increased in accordance with the power load or the running method determined by the main host apparatus, a multi-stage field pattern switching signal is output from the main host apparatus and input to the motor control apparatus, thereby switching the field pattern in the control apparatus in a multi-stage and realizing an accurate torque output.

According to the present invention, by dynamically shifting the entire field pattern in the vertical direction in accordance with the magnitude of the motor load, an accurate, smooth, and stable torque can be output.

According to the present invention, the motor current vector as the synthesized vector of the d-axis field current vector and the q-axis torque current vector is controlled such that the motor current in vector control falls within a desired range centered on a vector angle of 45°, that is the center between the d-axis and q-axis on the d-q axis vector plane. In terms of torque output, positive vector control can be realized, and an accurate, smooth, and stable torque can be output.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motor control apparatus comprising:
    a field weakening device for converting a velocity feedback signal obtained from a rotational speed of a motor into a secondary magnetic flux reference signal by using a field pattern;
    a field pattern selector for comparing a predetermined signal with a q-axis torque current reference signal obtained on the basis of the secondary magnetic flux reference signal converted by said field weakening device, the velocity feedback signal, a velocity reference signal, and a torque reference signal, and outputting, on the basis of a comparison result, a control signal for switching the field pattern; and a field pattern storage section for switching, on the basis of the control signal output from said field pattern selector, the field pattern to be used in said field weakening device.

2. An apparatus according to claim 1, wherein said field pattern storage section forcibly switches the field pattern to be used in said field weakening device to a flat field pattern.

3. An apparatus according to claim 1, wherein said field pattern storage section further comprises a section for forcibly switching the field pattern in said field weakening device on the basis of a control signal for switching the field pattern, which is input from a main apparatus.

4. An apparatus according to claim 1, further comprising a suppressing section for suppressing a rate of change of the secondary magnetic flux reference signal converted by said field weakening device within a predetermined range of the rate of change.

5. An apparatus according to claim 1, further comprising
  a first current controller for converting a feedback calculation result of the q-axis torque current reference signal and a d-axis feedback current signal obtained from a current flowing to said motor into a q-axis voltage reference signal,
  a magnetic flux saturation pattern generator for converting the secondary magnetic flux reference signal into a d-axis field current reference signal,
  a second current controller for converting a feed back calculation result of the d-axis field current reference signal generated by said magnetic flux saturation pattern generator and the d-axis feedback current signal obtained from the current flowing to said motor into a d-axis voltage reference signal, and
  a converter for generating pulse width modulation signals from the q-axis voltage reference signal converted by said first current controller and the d-axis voltage reference signal converted by said second current controller and outputting the generated pulse width modulation signals to gates of a power converter.

6. A motor control apparatus comprising:
  a field weakening device for converting a velocity feedback signal obtained from a rotational speed of a motor into a secondary magnetic flux reference signal by using a field pattern;
  a field shift calculator for calculating a shift amount of the field pattern to be used in said field weakening device, on the basis of a q-axis torque current reference signal obtained on the basis of the secondary magnetic flux reference signal converted by said field weakening device, the velocity feedback signal, a velocity reference signal, and a torque reference signal, such that a vector angle of a motor current vector falls within a predetermined range; and
  a field pattern storage section for shifting, on the basis of the shift amount calculated by said field shift calculator, the field pattern to be used in said field weakening device.

7. An apparatus according to claim 6, wherein said field pattern storage section forcibly switches the field pattern to be used in said field weakening device to a flat field pattern.

8. An apparatus according to claim 6, wherein said field pattern storage section further comprises a section for forcibly switching the field pattern in said field weakening device on the basis of a control signal for switching the field pattern, which is input from a main apparatus.

9. An apparatus according to claim 6, further comprising
  a first current controller for converting a feedback calculation result of the q-axis torque current reference signal and a d-axis feedback current signal obtained from a current flowing to said motor into a q-axis voltage reference signal,
  a magnetic flux saturation pattern generator for converting the secondary magnetic flux reference signal into a d-axis field current reference signal,
  a second current controller for converting the d-axis field current reference signal generated by said magnetic flux saturation pattern generator and the d-axis feedback current signal obtained from the current flowing to said motor into a d-axis voltage reference signal, and
  a converter for generating pulse width modulation signals from the q-axis voltage reference signal converted by said first current controller and the d-axis voltage reference signal converted by said second current controller and outputting the generated pulse width modulation signals to gates of a power converter.

10. A motor control apparatus comprising:
  a field weakening device for converting a velocity feedback signal obtained from a rotational speed of a motor into a secondary magnetic flux reference signal by using a field pattern; and
  a current calculator for calculating a d-axis field current reference signal, on the basis of a q-axis torque current reference signal obtained on the basis of the secondary magnetic flux reference signal converted by said field weakening device, the velocity feedback signal, a velocity reference signal, and a torque reference signal, such that a vector angle of a motor current vector falls within a predetermined range.

11. An apparatus according to claim 10, further comprising
  a first current controller for converting a feedback calculation result of the q-axis torque current reference signal and a q-axis feedback current signal obtained from a current flowing to said motor into a q-axis voltage reference signal,
  a second current controller for converting a feedback calculation result of the d-axis field current reference signal generated by said current calculator and a d-axis feedback current signal obtained from the current flowing to said motor into a d-axis voltage reference signal, and
  a converter for generating pulse width modulation signals from the q-axis voltage reference signal converted by said first current controller and the d-axis voltage reference signal converted by said second current controller and outputting the generated pulse width modulation signals to gates of a power converter.

* * * * *